United States Patent [19]

Rosaen

[11] Patent Number: 4,485,672

[45] Date of Patent: Dec. 4, 1984

[54] TAMPER-PROOF COVER FOR FLUID FLOW MONITOR

[75] Inventor: Lars O. Rosaen, Hazel Park, Mich.

[73] Assignee: Universal Filters, Inc., Hazel Park, Mich.

[21] Appl. No.: 431,345

[22] Filed: Sep. 30, 1982

[51] Int. Cl.³ ............................................. G01F 15/14
[52] U.S. Cl. ......................................... 73/273; 73/201
[58] Field of Search ........................ 73/201, 273, 431; 340/606, 693; 200/81.9 R

[56] References Cited

U.S. PATENT DOCUMENTS

| | | | |
|---|---|---|---|
| 1,631,472 | 6/1927 | Clark | 73/273 |
| 2,826,916 | 3/1958 | Lang | 73/273 |
| 2,844,962 | 7/1958 | Resko et al. | 73/273 X |
| 3,308,664 | 3/1967 | Kullmann | 73/273 |

*Primary Examiner*—Charles A. Ruehl
*Attorney, Agent, or Firm*—Gifford, VanOphem, Sheridan, Sprinkle & Nabozny

[57] ABSTRACT

A tamper-proof cover for a fluid flow monitor comprises a guard portion at least partly disposed about the monitor when the cover sealingly engages the fluid system in which the monitor is disposed. Preferably, the cover comprises an assembly including a plate fixed to the cover of the flow monitor to seal the interior of the device. Access to the monitor and alarm or actuator circuits disposed therein is impeded by the assembly so long as the cover seals the fluid system, and access thereto requires breaching the fluid system by removing the cover.

12 Claims, 4 Drawing Figures

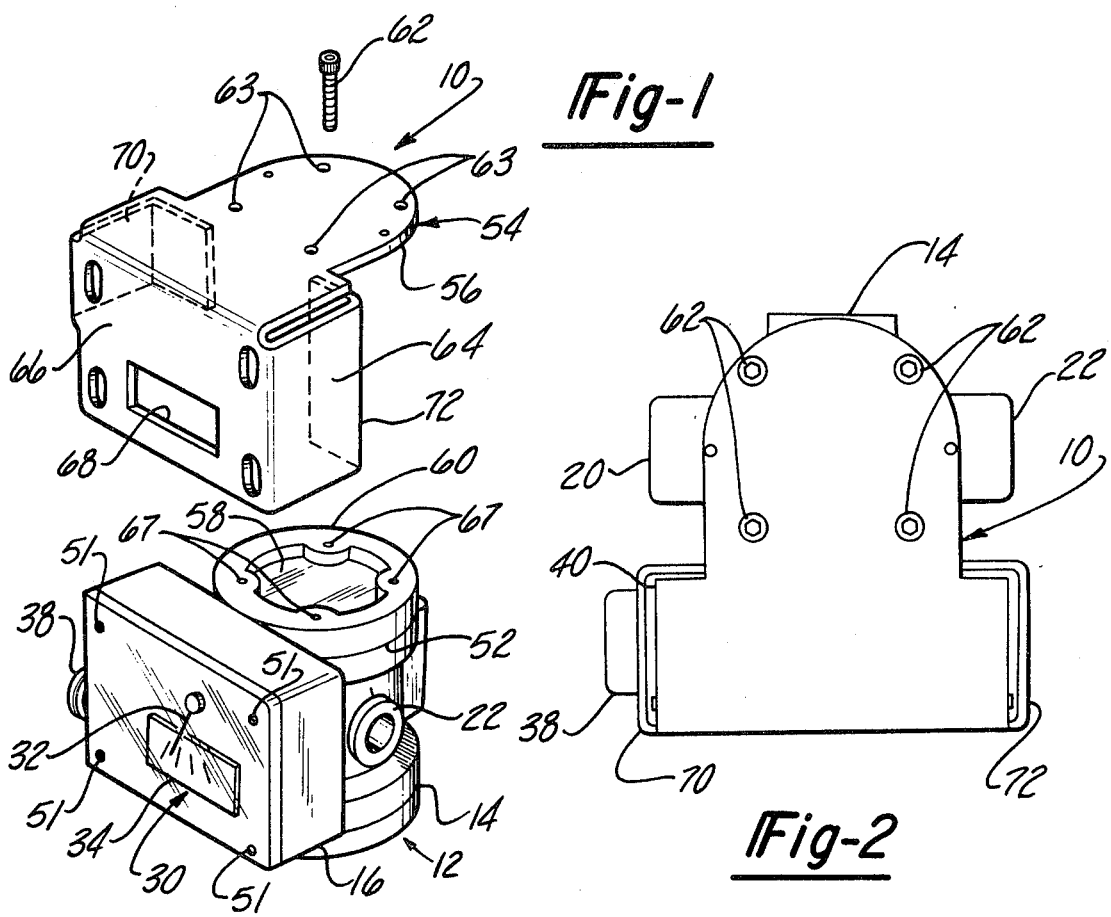
Fig-1
Fig-2
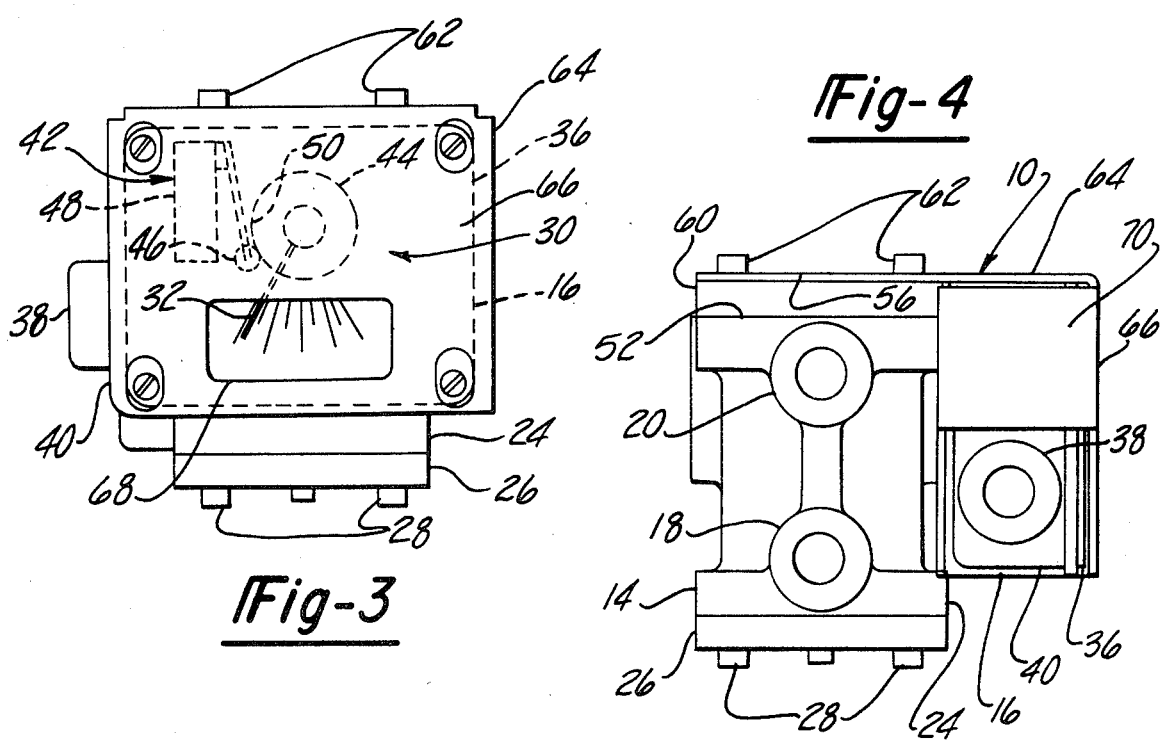
Fig-3
Fig-4

TAMPER-PROOF COVER FOR FLUID FLOW MONITOR

BACKGROUND OF THE INVENTION

1. Field of the Invention

The present invention relates to flow monitors for flowing fluid systems, and more particularly to a tamper-proof cover assembly for such flow monitors.

2. Description of the Prior Art

Flow monitors for fluid systems have long been known. These flow monitors vary widely in purpose and complexity. Many have electronic or mechanical means for quantitatively indicating or responding to the rate of fluid flow through the fluid system. Others have audible or visible alarms which are activated at a predetermined rate of flow. Some flow monitors combine quantitative flow indicating means with high and/or low flow rate.

One purpose of the quantitative flow indicating means and the alarms is to provide a fluid system operator with information regarding the rate of fluid flow in the system. There are many reasons why such information is desired or necessary. Two reasons are prominent. First, flow monitors indicating a low flow rate in a portion of the system may evidence a blockage or leakage in the system. Knowledge of a blockage in the system is critical in preventing damage to fluid pumps in a pressurized flow system. Knowledge of leakage from the system is similarly critical for pump protection and also for preventing fluid loss, system contamination, and the like. Second, a single flow monitor indicating a low flow rate at only a single point in the fluid system evidences a possible blockage or defect in the flow monitor itself.

One problem with the use of prior flow monitors has been the relative ease with which a system operator can circumvent the warnings provided by the alarms of, or flows indicated by, these monitors. It has been easier for a workman to manipulate the flow indicating means or alarm circuits or contacts, and prevent operation thereof, than it would be to inspect and/or repair that part of the system giving rise to the warnings.

SUMMARY OF THE PRESENT INVENTION

The present invention overcomes these and other problems with prior flow monitors by providing a cover assembly which prevents a fluid system operator from tampering with a flow indicating means or an alarm while the system is sealed. The cover assembly operatively seals the fluid system so that the system is disabled by removal of the cover assembly. The cover assembly is formed to prevent access to the flow indicating means or alarm activating mechanism when it is in its position for use. Preferably, the cover assembly includes a flat plate which is sealingly engageable with either the flow monitor housing or another component of the fluid flow system, so that removal of the cover assembly from the monitor breaches the fluid system. The flat plate in the preferred embodiment is the cover of the device affixed to a portion of the cover assembly. The cover assembly also includes at least one rigid portion disposed about some part of the flow monitor, so that when the cover assembly is in place (thereby sealing the fluid system) operator access to the flow indicating means or the alarm activating mechanism is prevented. Such access can only be had upon disengaging the cover assembly from the monitor housing thereby disabling the fluid flow system. Since disablement of the system cannot be avoided, there is no significant incentive to the operator to manipulate the alarm instead of resolving the problem giving rise to warning from the alarm or the flow indicating means.

BRIEF DESCRIPTION OF THE DRAWING

A better understanding of the present invention will be had upon reference to the following detailed description, when read in conjunction with the accompanying drawing wherein like reference characters refer to like parts throughout the several views, and in which:

FIG. 1 is a perspective view of the preferred embodiment of the present invention;

FIG. 2 is a top plan view of the preferred embodiment of the present invention;

FIG. 3 is a front plan view of the preferred embodiment of the present invention; and FIG. 4 is a side plan view of the preferred embodiment of the present invention.

DETAILED DESCRIPTION OF THE PREFERRED EMBODIMENT OF THE PRESENT INVENTION

With reference now to FIG. 1, the tamper-proof flow monitor cover of the present invention is there shown and comprises a cover assembly 10 which is adapted to fit over a flow monitor 12.

The flow monitor 12 comprises a fluid housing 14 and an indicator housing 16. The fluid housing 14 is fluidly connected to a fluid flow system (not shown) by either of inlet ports 18 and 20 (FIG. 4) and by an outlet port 22. A lower end 24 of the fluid housing 14 is sealed by a seal plate 26, which is fastened thereto by screws 28. The fluid housing 14 has a means (not shown) disposed therein for responding to the flow through the fluid housing 14. This responding means is connected to an indicating means 30 for indicating the rate of fluid flow through the meter. The indicating means 30 comprises a rotatable pointer 32 and a stationary scale 34 disposed in the indicator housing 16. The indicator housing 16 has a transparent cover 36 fastened thereto so that the indicating means 30 is visible externally to the indicator housing 16.

The indicator housing 16 also has a port 38 formed on a side 40 thereof, for passage of electrical connections (not shown) from the outside of the indicator housing 16 and to an alarm circuit actuator 42 disposed therein. The alarm circuit actuator 42 first comprises a cam 44 adjustably mounted coaxially with the pointer 32 and rotatable in unison therewith. A roller 46 of a roller switch 48 is biased against and rolls along a cam surface 50 on the cam 44. The cam 44 is positioned so that roller switch 48 is activated or deactivated at any selected point of rotation of the pointer 32 corresponding to any selected rate of flow through the flow monitor 12. For example, the position of the cam 44 can be set so that a pump whose operation is controlled by the actuator 42 is turned off when the flow rate through the fluid housing 14 is too low, evidencing either a blockage or a leak in the fluid system. Alternatively, the actuator 42 can activate a visual or audio alarm to warn an operator of flow conditions. Sealing means (not shown) are provided between the indicator housing 16 and the fluid housing 14 for fluidly sealing the indicator housing 16 from the fluid housing 14, thereby preventing the leakage of fluid from the system and into the housing 16 which could otherwise short the actuator 42. Access to the interior of indicator housing 16 is had by removal of screws 51 holding the cover 36 thereon.

The placement and structure of the flow indicator cover assembly 10 can now be described. An upper end 52 of the fluid housing 14 is sealed by a sealing portion 54 of the cover assembly 10, and more particularly by a plate 56 which sealingly engages an upper surface 58 of the upper end 52 of the housing 14. A seal 60 is disposed between the plate 56 and the surface 58, and the cover 10 is sealingly fastened to the flow monitor 12 by a plurality of screws 62 passing through a similar plurality of holes 63 in the cover assembly 10 and corresponding holes 67 in the seal 60.

The cover assembly 10 additionally comprises a guard portion 64 which extends about and surrounds enough of the indicator housing 16 to impede opening of the housing 16 and manipulation or improper operation of the pointer 32, the cam 44, or the roller switch 48. Specifically, the guard portion 64 first comprises a downwardly depending panel 66 having an aperture 68 through which the pointer 32 and the scale 34 can be viewed. The guard portion 64 additionally comprises a pair of right angled depending flaps 70 and 72 which wrap around the exposed sides of indicator housing 16. The flaps 70 and 72 are of L-shaped cross-section in a plane parallel to the plate 56. The flap 70 is cut shorter than the flap 72 so as not to overlap the port 38. The cover assembly 10 is preferably formed from a single piece of sheet metal and bent and cut to fit the shape of the flow monitor 12.

Use of the tamper-proof flow monitor cover assembly 10 can now be readily understood. The flow monitor 12 is assembled as usual, except that the sealing portion 54 of the cover assembly 10 seals the fluid housing 14. The seal 60 is placed on the surface 58 at the end 52 of the housing 14 and the cover assembly 10 is placed over the fluid monitor 12. The portion 54 is then sealingly engaged with the fluid housing 14 by tightening of the screws 62. The guard portion 64 is thereby positioned to prevent tampering with the indicator mechanism 30.

So long as the cover 10 remains in position the guard portion 64 prevents tampering with the indicator mechanism 30 by impeding access thereto. The only convenient way in which to obtain access to the indicator housing 16 and the indicator mechanism 30 therein is to remove the screws 62, thereby unsealing the fluid housing 14 and disabling the fluid system. Thus, when a condition in the system gives rise to activation of the roller switch 48, the switch 48 (and its associated alarm or pump) cannot be reversed until the cover 10 is removed and the system is disabled. Once an operator has taken the steps necessary to obtain access to the indicator housing 16 and its contents, there is no incentive to merely manipulate or disable the indicator mechanism. Instead, the operator's likely course of action is to examine and correct the conditions leading to the original activation of circuit actuator 42. Advantageously, the flaps 70 and 72 prevent prying open the indicator housing 16 from the side, yet the cover 10 is easily slidable over the fluid monitor 12.

Having described my invention, however, many modifications thereto will become apparent to those skilled in the art to which it pertains without deviation from the spirit of the invention as defined by the scope of the appended claims.

For example, the point in the fluid flow system at which the monitor cover sealingly engages the system need not be at the monitor, but rather may be at any other location upstream or downstream from the monitor, so long as the cover operatively seals the fluid system.

I claim:

1. A tamper-proof fluid flow monitor cover assembly sealingly engageable with a component of a fluid flow system, said system comprising at least one fluid flow monitor, and said monitor cover assembly comprising a guard portion at least partly disposed about said flow monitor when said monitor cover assembly is sealingly engaged with said component of said system, wherein said monitor cover assembly comprises a plate sealingly engageable with said component of said system, said plate being affixed to said guard portion, whereby said guard portion restricts access to said flow monitor when said monitor cover assembly is sealingly engaged with said system.

2. The invention according to claim 1, wherein said flow monitor comprises an indicator housing, and said guard portion is at least partly disposed about said indicator housing when said monitor cover assembly is sealingly engaged with said system.

3. The invention according to claim 2, wherein said indicator housing comprises a detachable indicator housing cover, whose removal from said indicator housing is impeded when said monitor cover assembly is sealingly engaged with said system.

4. The invention according to claim 1, wherein said flow monitor comprises means for indicating the flow of fluid through said system, and said guard portion is at least partly disposed about said indicating means when said monitor cover assembly is sealingly engaged with said system.

5. The invention according to claim 4 wherein said indicating means comprises a circuit actuator.

6. The invention according to claim 5, wherein said circuit actuator comprises a roller switch.

7. The invention according to claim 1, wherein said monitor is capable of deactivating fluid flow within said fluid flow system when said monitor and said cover assembly are sealingly engaged with said system.

8. A tamper-proof fluid flow monitor cover assembly sealingly engageable with a component of a fluid flow system, said system comprising at least one fluid flow monitor, and said monitor cover assembly comprising a guard portion at least partly disposed about said flow monitor when said monitor cover assembly is sealingly engaged with said component of said system, whereby said guard portion restricts access to said flow monitor when said monitor cover assembly is sealingly engaged with said component of said system, wherein said monitor cover assembly comprises a plate sealingly engageable with said component of said system, and wherein said guard portion comprises a panel depending from said plate and disposed adjacent to a portion of said flow monitor when said monitor cover assembly is sealingly engaged with said system.

9. The invention according to claim 8, wherein said guard portion additionally comprises at least one flap, said at least one flap disposed at least partly about said flow monitor when said monitor cover assembly is sealingly engaged with said system.

10. The invention according to claim 9, wherein said at least one flap is of L-shaped cross-section.

11. The invention according to claim 8, wherein said component comprises said at least one fluid flow monitor.

12. A fluid flow monitor cover sealingly engageable with a fluid flow monitor, said cover comprising a guard portion, and a plate affixed to said guard portion and depending therefrom; wherein said plate is sealingly engageable with said monitor; and wherein said guard portion is at least partly disposed about said monitor when said plate is sealingly engaged with said monitor; whereby said guard portion restricts access to said monitor when said plate is engaged with said monitor.

* * * * *